(12) United States Patent
Mawby (10) Patent No.: US 8,544,319 B2
(45) Date of Patent: Oct. 1, 2013

(54) TIRE UNIFORMITY THROUGH DISPERSION OPTIMIZATION

(75) Inventor: William David Mawby, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 20 days.

(21) Appl. No.: 13/262,648

(22) PCT Filed: Apr. 29, 2009

(86) PCT No.: PCT/US2009/042082

§ 371 (c)(1),
(2), (4) Date: Oct. 3, 2011

(87) PCT Pub. No.: WO2010/126498

PCT Pub. Date: Nov. 4, 2010

(65) Prior Publication Data

US 2012/0031179 A1 Feb. 9, 2012

(51) Int. Cl.
*G01M 17/02* (2006.01)
*G06F 15/00* (2006.01)

(52) U.S. Cl.
USPC ................................... 73/146; 702/145; 73/8

(58) Field of Classification Search
USPC .............................................. 73/146–146.8
See application file for complete search history.

(56) References Cited

U.S. PATENT DOCUMENTS

| | | | |
|---|---|---|---|
| 4,594,878 A * | 6/1986 | Abe et al. | 73/9 |
| 5,396,438 A | 3/1995 | Oblizajek | |
| 7,082,816 B2 | 8/2006 | Zhu | |
| 2004/0020583 A1 | 2/2004 | Zhu et al. | |
| 2005/0081614 A1 | 4/2005 | Zhu | |
| 2005/0172707 A1 * | 8/2005 | Kanatani et al. | 73/146 |
| 2006/0123898 A9 | 6/2006 | Zhu | |
| 2006/0231191 A1 | 10/2006 | Mawby et al. | |
| 2011/0246128 A1 * | 10/2011 | Nicholson et al. | 702/145 |
| 2012/0035757 A1 * | 2/2012 | Mawby et al. | 700/104 |

OTHER PUBLICATIONS

PCT International Search Report for PCT/US2009/042082, dated Jun. 19, 2009.

* cited by examiner

*Primary Examiner* — Andre Allen
(74) *Attorney, Agent, or Firm* — Dority & Manning, P.A.

(57) ABSTRACT

A system and related method for improving tire uniformity includes providing at least one set of test tires constructed with one or more process elements provided at known relative angular locations. At least one uniformity parameter, such as radial or lateral run-out, balance, mass variation, radial lateral or tangential force variation, is measured for at least one harmonic of interest for each test tire. Respective rectangular coordinates are determined for each measured uniformity parameter and harmonic of interest for each tire. A form of the determined rectangular coordinates (e.g., the rectangular coordinates themselves and/or the log of the residuals squared) is analyzed for each tire to identify optimized relative angular locations for each process element that reduce dispersion (or dispersion and mean) of the measured uniformity parameter. New tires are built with the one or more process elements positioned in the identified optimized relative angular locations.

17 Claims, 8 Drawing Sheets

TIRE UNIFORMITY THROUGH DISPERSION OPTIMIZATION

FIELD OF THE INVENTION

The invention relates to tire uniformity, and more specifically to a method for analyzing and controlling the uniformity of tires during and after tire manufacturing.

BACKGROUND OF THE INVENTION

Tire non-uniformity relates to the symmetry (or lack of symmetry) relative to the tire's axis of rotation in mass, geometric or stiffness characteristics. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often calculate the above and other uniformity characteristics by measuring force at a number of points around a tire as the tire is rotated about its axis.

Many different factors can contribute to the presence of non-uniformities in tires, even when the tires are built under seemingly identical process conditions. Examples of such factors include the location of product start points and/or joint overlap locations for one or more of the many complex tire building products and/or steps. Exemplary products include the casing textile plies, the belt plies, bead rings, the inner liner, the tread and other rubber layers. Steps involving these and other products include the application of such products to a form or drum, placing the resulting green structure in a mold or press and subjecting the structure to heat and pressure to shape and cure the rubber products and bond the materials into an integrated unit.

The contribution of selected factors to overall tire uniformity can be modeled using vector statistics. For example, a measurement machine can be used to obtain a waveform representative of tire uniformity, which can be decomposed into respective harmonic components. Each harmonic component waveform can be characterized as a vector having some magnitude and phase, where the magnitude or length of the vector is the peak-to-peak value of the harmonic waveform and the vector phase corresponds to the angle where the first peak of the harmonic waveform occurs.

As previously mentioned, even when tires are built under seemingly identical process conditions, there will be some variation in the population of vectors. As such, it is useful to obtain a population of uniformity vectors by measuring and decomposing the uniformity harmonics for a plurality of tires. The population of vectors can then be averaged to obtain a mean vector representative of the average uniformity value for a population of tires. Known techniques for improving tire uniformity have typically been implemented to optimize this average or mean value, for example, by reducing the magnitude of the resultant mean uniformity vector. This optimization is based on the assumption that each product and/or process contributes some non-uniformity to the tire that combines to form a resultant sum. By changing the angular placement of a product or process effect in the overall tire building process, tire component effects can offset one another to reduce the average or mean value of a measured uniformity parameter.

Methods for improving tire uniformity that only optimize the average or mean value of tire uniformity ignore other meaningful statistical properties. The present disclosure provides new techniques for improving tire uniformity based on the discovery that uniformity dispersion is one such key contribution to tire uniformity modeling. Dispersion is the scattered variation of individual uniformity vectors around the average or mean vector. By optimizing dispersion levels, alone or in combination with optimization of other parameters such as the uniformity mean, improved optimization results can be achieved in accordance with aspects of the present invention.

Although known technologies for tire uniformity improvement have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved system and methodology has been provided to improve uniformity in tires. Such methodology generally involves constructing and providing one or more sets of test tires, modeling and analyzing measured parameter(s) associated with the test tires (including dispersion of the measured parameter(s)), and building improved tires based on the dispersion analysis.

The test tires and improved tires are constructed with one or more process elements respectively characterized by a known angular location relative to some reference point on the tire. Process elements may selectively include such features as tire material components, manufacturing techniques, and/or controllable conditions used in the tire construction process. In one example, the angular location of material component process elements corresponds to the product start point or joint overlap location of one or more of casing textile plies, belt plies, bead rings, inner liner, tread and other rubber layers of the tires. In another example, the angular location of manufacturing techniques corresponds to the relative location in which a green tire is introduced on a building drum, placed into a mold or curing press, and the like. Still further examples of controllable conditions correspond to the temperature and pressure at which green tires are subjected during the curing process or other manufacturing steps.

One or more test tires having process elements positioned at known angular locations are measured in accordance with methods of the present invention. At least one uniformity parameter for at least one harmonic of interest is determined. Such uniformity parameters may selectively include one or more of radial run out (RRO), lateral run out (LRO), balance, mass variance, radial force variation (RFV), lateral force variation (LFV) and tangential force variation (TFV). It is then possible to determine a vector representation for each harmonic of interest for each measured parameter. In order to more effectively analyze such vector data in accordance with the disclosed techniques, the vector data is converted into respective rectangular coordinates (e.g., x and y components). It is recognized that for a given set of test tires, there will be variation or dispersion among the x and y components of each measured parameter, even when the test tires are built under seemingly identical process conditions. This dispersion is then analyzed in one or more ways in accordance with the subject methods.

In one exemplary method, the rectangular coordinates are used to compute residual vectors for each measured test tire. Residual vectors generally correspond to the individual rectangular coordinates with the mean vector (or average value of the measured parameters across the set of test tires) subtracted out. The residual vectors are then transformed by computing the log of the squared value of each residual component. The contribution of each process element to the transformed residual vectors is then determined, for example, using regression-based signature analysis. Knowing the signatures of each process element can enable a subsequent determination of optimized relative angular locations for each process element that reduce dispersion of the measured uniformity parameter.

In another exemplary method, the above analysis of the transformed residual vectors is conducted, along with analysis of the raw data (i.e., the rectangular coordinates). As such, the contribution of each process element to the transformed residual vectors is determined, as well as the contribution of each process element to the average vector. Both these contributions are used to determine optimized relative angular locations for each process element that simultaneously reduce both dispersion and mean of the measured uniformity parameter. In some embodiments, the optimization of both mean and dispersion occurs by weighting the respective effects of dispersion and mean at different levels, then combining the weighted effects to determine the best combination of process elements to achieve an optimized yield.

In addition to various methodologies, it is to be understood that the present subject matter equally relates to associated systems, including various hardware and/or software components that may be provided in a tire manufacturing and measurement system. In one exemplary embodiment, the present subject matter concerns a system for improving the uniformity of tires, including manufacturing components as well as modeling components. The manufacturing components are part of a tire construction system that builds tires in accordance with known techniques such that one or more process elements are positioned in accordance with particular angular locations relative to a reference point on each tire. The modeling components generally include both hardware for obtaining tire uniformity measurements as well as hardware and software for analyzing and processing the measurements to determine improved process element locations that reduce dispersion or dispersion and mean of the measured uniformity parameters. The determined improved process element locations are then either provided as a displayed output to a user or fed back in a control loop to the manufacturing process such that the improved process element locations can be implemented in subsequent tire construction.

In one exemplary embodiment, processing components of the tire measurement system include a first memory/media element adapted for storing one or more of the measured uniformity parameters for a plurality of test tires, as well as rotational characteristics for one or more process elements used in constructing the plurality of test tires. A second memory/media element is adapted for storing software in the form of computer-executable instructions. At least one processor is coupled to the first and second memories and configured to selectively implement the computer-executable instructions stored in the second memory to process the measurements and other data stored in the first memory. A third memory/media element may also be provided for storing output data to provide to a user or for subsequent processing or feedback control.

In a particular embodiment of the above tire measurement system, the one or more processors implement the computer-executable instructions stored in memory in order to implement the functions of: determining respective rectangular coordinates for each measured uniformity parameter and harmonic of interest for each tire; and analyzing a form of the determined rectangular coordinates for each tire to identify optimized relative angular locations for each process element that reduce dispersion (and optionally also reduce the mean) of the measured uniformity parameter.

Additional embodiments of the present subject matter, not necessarily expressed in the summarized section, may include and incorporate various combinations of aspects of features, components, or steps referenced in the summarized embodiments above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters throughout the present specification and appended drawings is intended to represent same or analogous features, elements or steps of the present invention.

DETAILED DESCRIPTION OF THE PREFERRED EMBODIMENTS

As discussed in the Summary of the Invention section, the present subject matter is particularly concerned with a system and method for improving tire uniformity by optimizing uniformity dispersion during and/or after the tire manufacturing process.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Referring now to the drawings, a brief discussion of exemplary steps performed in a method of the present invention will first be discussed, generally with reference to FIGS. 1A through 8. Exemplary hardware components used to obtain tire measurements and perform the disclosed optimization techniques used in the tire manufacturing process will subsequently be discussed with reference to FIG. 9.

Figure 1A:
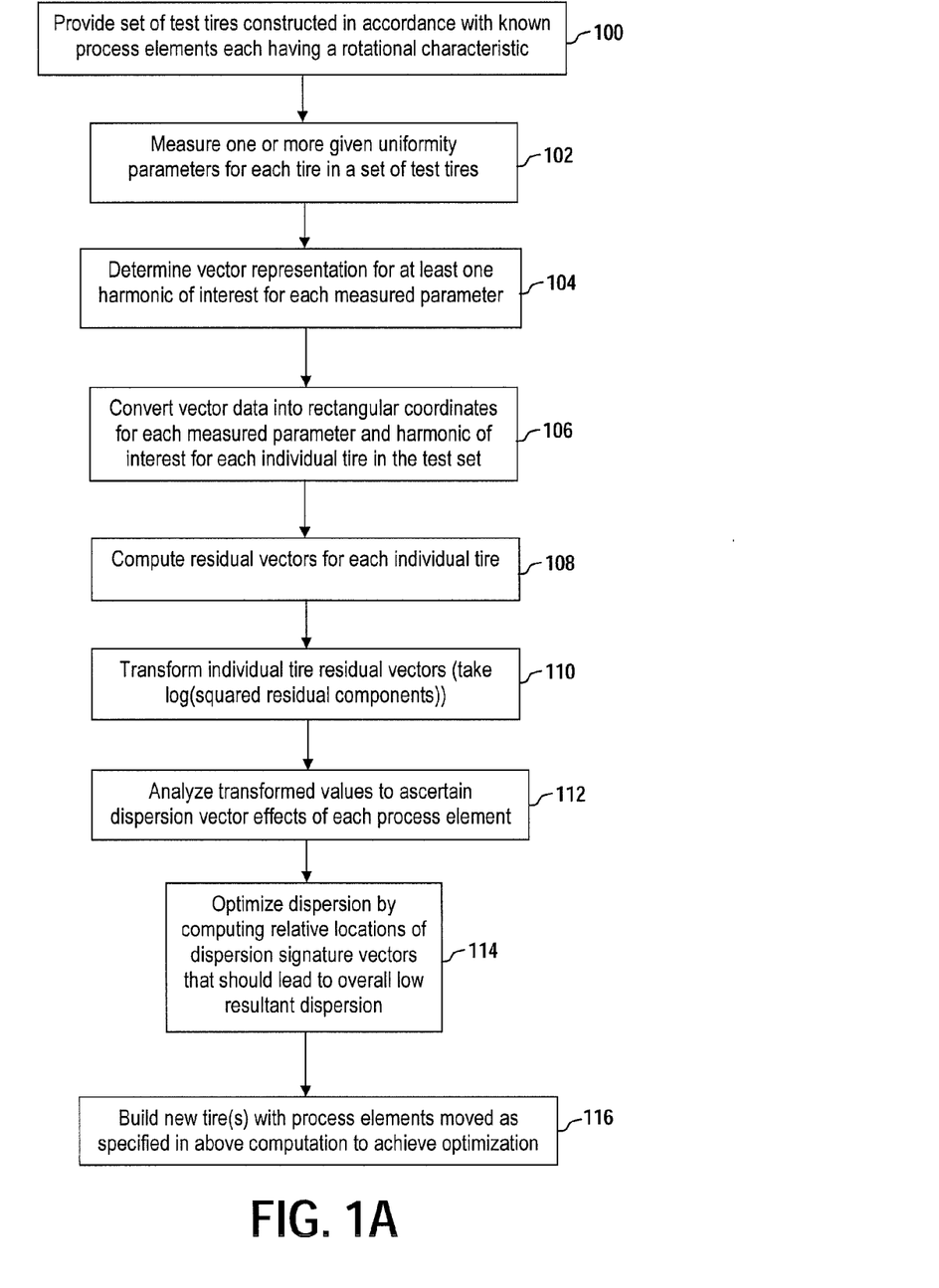
FIG. 1A provides a flow chart of exemplary steps and features in a first method of improving tire uniformity through dispersion optimization.

Referring now to FIG. 1A, a first step 100 in an exemplary method according to the present disclosure involves providing a set of test tires that are built in accordance with one or more process elements each having a rotational characteristic. The term "process elements" as used herein is intended to encompass any of the multiple material components that are used in construction of a tire, the various manufacturing techniques that are used in tire construction, or certain controllable conditions that affect tire building. For example, material components such as the casing textile plies, the belt plies, bead rings, the inner liner, the tread and other rubber layers are all combined to form the tire carcass, belt and summit portions. The application of each such material to one or more tire drums during the manufacturing process may be considered a process element. As another example, the manufacturing technique of putting a green tire in a curing press constitutes another process element. Still further, controllable characteristics like the curing temperature and pressure may constitute exemplary process elements.

In accordance with the present methodology, it should be appreciated that the above process elements and others may respectively be characterized by a rotational characteristic. More specifically, being characterized by a rotational characteristic will involve the ability for some aspect of each process element to be measured at some angular location relative to a reference point on each tire. For example, each process element corresponding to the formation of a different tire layer can include an angular representation of the product start points and/or joint overlap locations. An angular representation of the relative location at which a tire is positioned within a curing press can also be determined. A detailed example of such angular representations is shown in FIG. 2.

Figure 2:
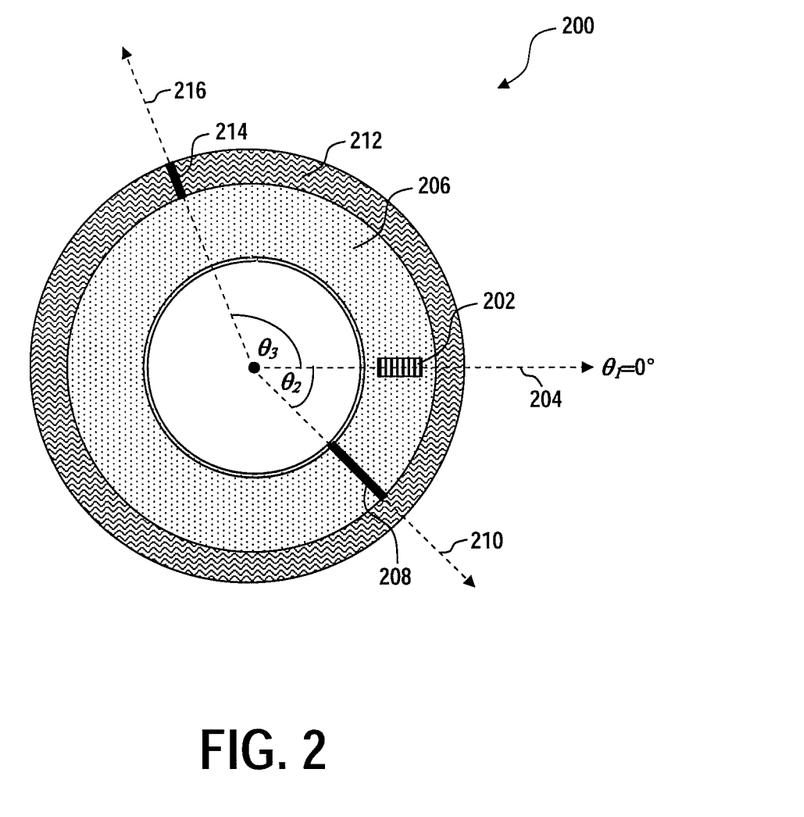
FIG. 2 provides a component representation of an exemplary tire and corresponding process elements which can be configured by angular location to optimize dispersion in accordance with aspects of the present invention.

Referring to FIG. 2, an exemplary tire 200 is shown with a reference point chosen to correspond to a bar code 202 on the tire exterior. Since the angular position 204 of bar code 202 is a reference point, it is shown in FIG. 2 as being positioned at an angle $\theta_1$=zero degrees (0°). The selection of a tire barcode is not essential, and it should be appreciated that any visually recognizable marking or the like may be chosen as a reference point for angular characterizations.

A first layer 206 in tire 200 is representative of a tire carcass and is formed with applied layers that connect at a joint location 208. If the application of the materials forming tire carcass 206 is considered a process element in accordance with the present technology, then the angular characteristic of the joint location relative to reference point $\theta_1$ should be known. As shown in FIG. 2, angular location 210 of joint 208 is represented by angle $\theta_2$, which is known relative to $\theta_1$. Similarly, a second layer 212 in tire 200 may be representative of a tire tread portion and is formed with applied layers that connect at a joint location 214. The angular location 216 of joint 214 is represented by angle $\theta_3$, which is also known relative to $\theta_1$.

Referring again to FIG. 1, a second exemplary step 102 in the subject method involves measuring one or more given parameters for each tire in the provided set of test tires. In general, the subject technology involves the measurement of tire uniformity parameters, and can focus on the measurement and optimization of one or more of such parameters. Examples of such uniformity parameters may include but are not limited to one or more of the following: radial run out (RRO), lateral run out (LRO), mass variance, balance, radial force variation (RFV), lateral force variation (LFV) and tangential force variation (TFV). Examples that discuss selected ones of the above parameters are presented herein for illustrative purposes only and should not be unnecessarily limiting to the present invention.

Figure 3A:
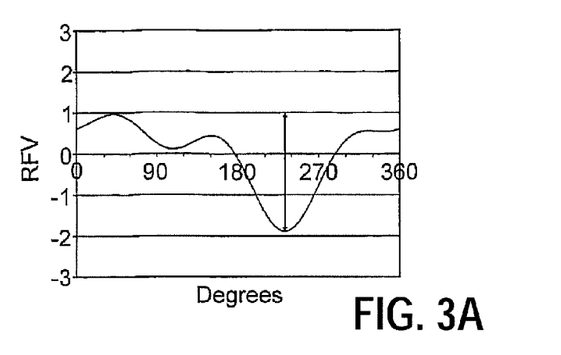
FIGS. 3A through 3C, respectively, depict schematic representations of a uniformity measurement of the radial force variation of a tire showing the original composite waveform as well as respective first and second harmonic components.

A next step 104 in the method of FIG. 1A involves determining a vector representation for at least one harmonic of interest for each parameter measured in step 102. As an example, consider that it is desired to measure and optimize the radial force variation (RFV) for a given set of test tires. FIG. 3A shows a schematic of the measured RFV for a cured tire. The abscissa represents the circumference of the tire and the ordinate the radial force variations. FIG. 3A is the as-measured signal and is referred to as a composite waveform. The composite waveform may comprise a large number of combined harmonics. The individual harmonics may be obtained by applying Fourier decomposition to the composite signal.

Figure 3B:
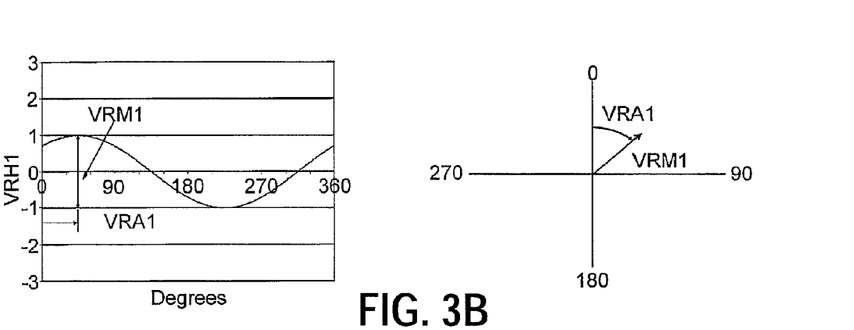
Figure 3C:
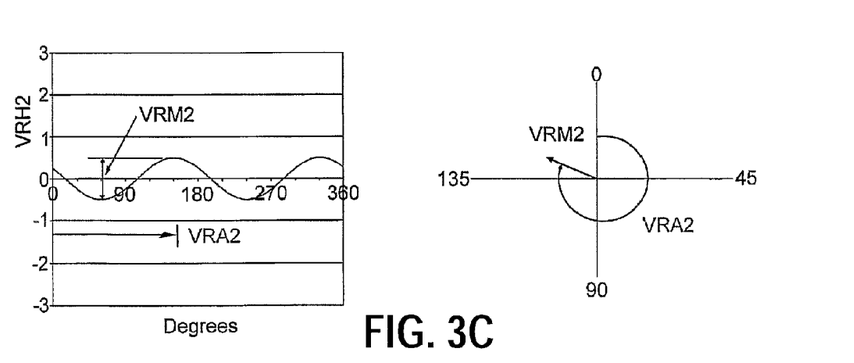

FIGS. 3B and 3C depict the resulting first and second harmonics, respectively, extracted from the composite signal. The magnitude of the first harmonic of radial force VRM1 is defined as the difference between the maximum and minimum force. The phase angle or azimuth of the first harmonic VRA1 is defined as the angular offset between the reference location for the measurement and the location of maximum radial force. Thus, the sine wave depicted by Cartesian coordinates in FIG. 3B can be equally shown as a vector in the polar coordinate scheme. Such a vector plot is shown in FIG. 3C immediately to the right of the sine wave plot. The RFV vector of the first harmonic VRH1 has a length equal to VRM1 and is rotated at an angle equal to the azimuth VRA1. In a similar manner, one can extract the second harmonic vector VRH2 shown in FIG. 3C that has a force magnitude VRM2 and an azimuth VRA2. The corresponding polar plot for the H2 vector resembles the H1 vector, except that the angular coordinate is now two times the azimuth angle.

In the description of an example of the method that follows, the particular example is confined to the optimization of the first harmonic H1. However, it is within the scope of the present invention to apply the method to optimize a different harmonic such as H2, H3, etc. Likewise, the following example describes the optimization of radial force variation, whereas it is within the scope of the invention to apply the method to the correction of other uniformity characteristics such as cured tire radial runout or lateral force variation. In brief, the method may be used to optimize the harmonics of any measurable uniformity characteristic with suitable modifications to the vector equations described below.

Figure 4:
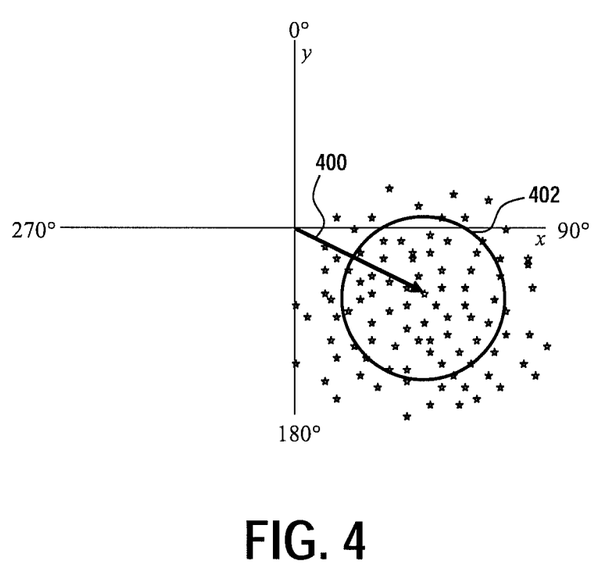
FIG. 4 is a vector plot of a data set of an exemplary measured uniformity parameter for multiple respective tires, including an average vector and dispersion area resulting from the measured data set.

Referring again to FIG. 1A, a next step 106 involves converting the vector data determined in step 104 into rectangular coordinates for each measured parameter and harmonic of interest for each individual tire in the test set. A graphed representation of such converted data points is shown in FIG. 4, with each star representing a different plot of the rectangular coordinates obtained in step 106 for a population of vectors determined in step 104. If the magnitude (MAG) of each vector is the distance the star is from the origin, and the azimuth (AZI) is the angle of each vector from the x-axis (0°), then $x_i$ and $y_i$ rectangular coordinates for each data point i:1, 2, . . . , N for N test tires are given by the equations:

$$x_i = MAG_i \cos(AZI_i) \text{ and } y_i = MAG_i \sin(AZI_i).$$

The rectangular coordinates (both x and y components) of the uniformity vectors shown in FIG. 4 can be modeled as random variables with bivariate normal distribution having parameters $\mu_x$ (the mean of x), $\mu_y$, the mean of y, $\sigma_x$ (the standard deviation of x), $\sigma_y$ (the standard deviation of y) and covariance C (the correlation between x and y).

The mean vector, which is generally an indicator in uniformity analysis that something is systematically affecting every tire in a test set, is shown graphically in FIG. 4. The average vector for the population of VRH1 vectors shown in FIG. 4 is represented by the ray 400 starting at the origin and extending outwards at an angular position of about 130°. Rectangular coordinates X and Y defining the average vector (or mean vector) are calculated by averaging the x and y coordinates of the individual vectors as follows:

$$X = \sum_{i=1}^{N} x_i/N \text{ and } Y = \sum_{i=1}^{N} y_i/N.$$

The magnitude (MAG) and angle (AZI) of the average vector 400 can be calculated from the average X and Y values as follows:

$$MAG = \sqrt{X^2 + Y^2} \text{ and } AZI = \arctan\left(\frac{Y}{X}\right).$$

Dispersion is represented in FIG. 4 as the scatter of the individual tire vectors around the average vector 400. The differences observed between the individual tire vectors within a test set as shown may be caused by many differences in the manufacturing process, including but not limited to processing conditions, material properties, measurement errors, etc. One way to mathematically represent the amount of scatter of the individual vectors is by the area of the standard ellipse, shown as area 402 in FIG. 4. In tire vectors, covariance is usually negligible and can thus be ignored. As such, the area of the standard ellipse 402 (ASE) can be calculated as:

$$ASE = \pi \sigma_x \sigma_y.$$

As discussed in the Background of the Invention section, above, some known uniformity optimization techniques are concerned primarily with optimizing the mean or average vector of a population of test tires. Known techniques for optimizing an average vector, such as vector 400 shown in FIG. 4 are based on the underlying assumption that each process element (such as the process elements shown in and discussed with reference to FIG. 2) contributes some non-uniformity to the tire. In other words, each process element has a signature. Knowing the orientation and magnitude of each of the effects would allow a technician to compensate the signatures by rotating one or more signatures relative to the rest. As a result, process angles change while the magnitudes of the effects remain the same. The new process angles can be chosen in a way to reduce the magnitude of the average vector 400.

Figure 5:
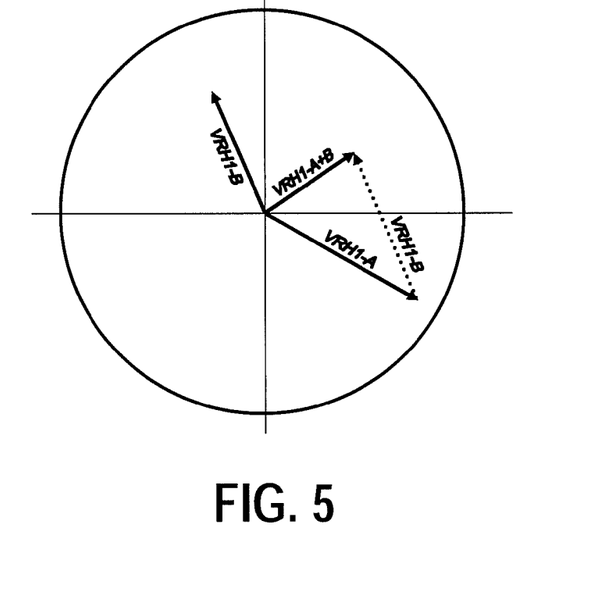
FIG. 5 is a vector plot of resultant radial force variation due to exemplary process elements A and B provided in respective original locations.
Figure 6:
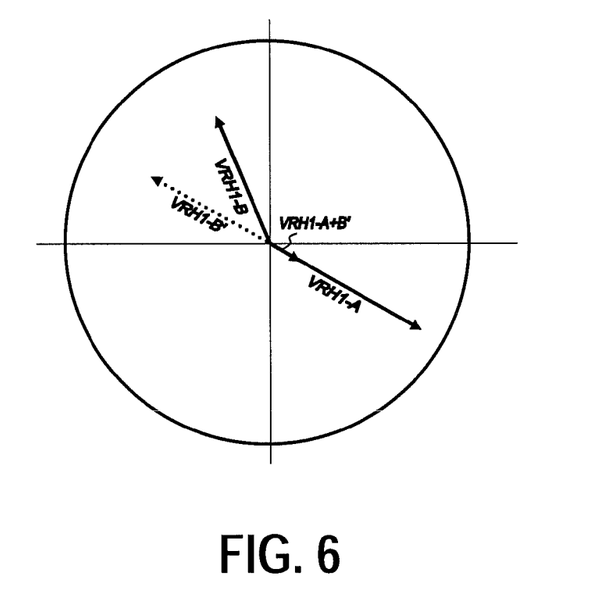
FIG. 6 is a vector plot of radial force variation due to exemplary process elements A and B provided in respective selectively rotated locations.

An example of such known uniformity process techniques that optimize only the mean are illustrated in FIGS. 5 and 6. Consider a set of test tires manufactured to produce a tire such as represented in FIG. 2. Two known process elements contribute to the tire manufacture—namely, joint 208 of first tire layer 206 (process element A) and joint 214 of second tire layer 212 (process element B). Consider also that radial force variation is measured for each of the test tires 200, and that an assumption is made that only the two joints shown in FIG. 2 contribute to the overall radial force variation (i.e., other known and unknown contributing factors which are normally also present are ignored) in each tire. The total RFV vector of the first harmonic (VRH1) can be determined from the measurements, and the mean vector of those measurements can be represented as VRH1-A+B in FIG. 5. Since the relative angular locations of process elements A and B are known, mathematical calculations can be applied to determine the component vectors VRH1-A (process element A's average contribution to the VRH1-A+B value) and VRH1-B (process element B's average contribution to the VRH1-A+B value).

After obtaining modeling information as shown in FIG. 5, it is possible to optimize the overall radial force variation by selectively rotating the location of each of the process elements A and B. So, for example, as shown in FIG. 6, if process element A remains the same but process element B is rotated to a new location represented as vector VRH1-B', then the two vector contributions of VRH1-A and VRH1-B' will add to yield new total vector VRH1-A+B'. Comparing the magnitude of the new average vector VRH1-A+B' in FIG. 6 to the original VRH1-A+B vector from FIG. 5, one can see that it is possible to reduce the magnitude of the mean VRH1 value over a set of test tires.

The optimization process discussed in FIGS. 5 and 6 may be useful for reducing a mean or average value of a uniformity measurement in a set of test tires, but it ignores another important statistical property of tire modeling, namely the uniformity dispersion. So, for example, consider the VRH1-A+B and VRH1-A+B' vectors from FIGS. 5 and 6. It may have been the case that the dispersion of the mean vector VRH1-A+B is represented by the area of the standard ellipse (ASE) depicted as circle 702 in FIG. 7. When comparing the dispersion represented by circle 702 to a fixed customer yield limit represented by circle 704, an average number of manufactured tires represented by area 706 will fall outside the acceptable yield limit.

Figure 7:
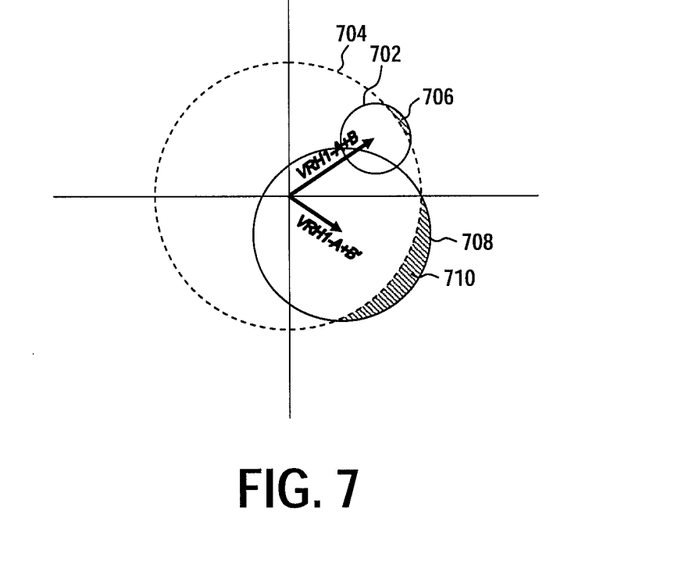
FIG. 7 is a vector plot representing the possible change in dispersion areas resulting from the rotation of a radial force variation vector.

As appreciated from FIG. 7, dispersion has been determined to depend on the rotation angle of the measured parameter. As such, when uniformity is optimized but dispersion is ignored, it is possible that the dispersion of the mean vector VRH1-A+B' is actually much greater. For example, consider an increased dispersion of the mean vector VRH1-A+B' represented by the area of the standard ellipse (ASE) depicted as circle 708 in FIG. 7. The area 710 falling outside the acceptable yield limit 704 is actually greater than the area 706. In such a case, although the mean VRH1 magnitude is optimized with new locations of process elements A and B, more manufactured tires will ultimately be rejected according to the acceptable yield limit 704 indicated in FIG. 7.

The disclosed technology provides advantages in that it seeks to optimize tire uniformity parameters (such as first harmonic radial force variation in the above example) by accounting for the above-described dispersion effects. Depending on the desired techniques, the disclosed technology can be used to optimize dispersion alone, or dispersion as well as mean in order to increase uniformity yields. Increased yield will afford the advantage of either keeping more tires during a quality level sorting process or avoid having to subject tires to costly rectification processes such as tire grinding, mass adding or additional changes to the manufacturing process.

Referring again to the process steps in the flow chart of FIG. 1A, once rectangular coordinates are obtained for all the vector data in step 106, the residual vectors for each individual tire are calculated in step 108. The residual vectors are equal to the individual vectors with the average vector (or mean value) subtracted out. For example, referring to FIG. 8, consider a plurality of uniformity measurements each represented by an average vector 800 plus a respective dispersion vector, or departure from the average vector. The respective dispersion vectors are represented as those vectors generally encompassed within circle 802. If the average vector is subtracted from the dispersion vectors, then the result will be the vectors centered at the origin and generally encompassed by circle 804.

Figure 8:
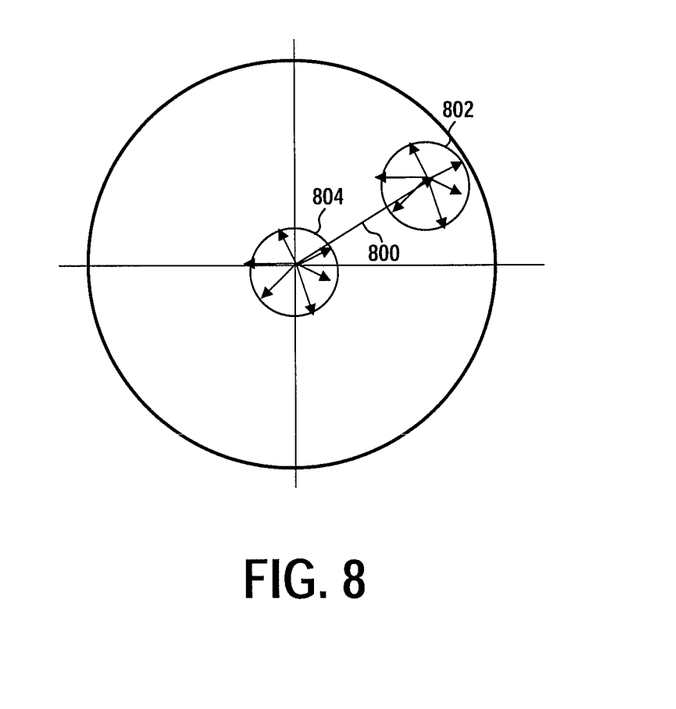
FIG. 8 is a vector plot of exemplary dispersion vectors and corresponding residual vectors calculated in accordance with aspects of the present invention.

The vectors within circle 804 of FIG. 8 graphically represent the residual vectors calculated in step 108 of FIG. 1A. It is this area encompassed by circle 804 that dispersion optimization in accordance with the presently disclosed methodology seeks to minimize. In order to calculate such an optimization, the x and y values for the residual vectors calculated in step 108 are subsequently transformed in step 110 of the process shown in FIG. 1A for purposes of correct numerical treatment. Such transformation can be thought of as turning each residual value into its respective component of the statistical value referred to herein as COMP. COMP represents the average of all residual vectors, or the compensated mean of the original uniformity measurements.

To estimate COMP, the average magnitude of the residual vectors is determined from the following formula, where (X, Y) is the average vector, and $x_i$ and $y_i$ are the rectangular x and y components for each of the n measured tires in a test set, i=1, 2, ..., n. Alternatively, the residual vectors can be represented by respective rectangular components $rx_i$ and $ry_i$:

$$COMP = \frac{\sum_{i=1}^{N} \sqrt{((x_i - X)^2 + (y_i - Y)^2)}}{n} = \frac{\sum_{i=1}^{N} \sqrt{(rx_i^2 + ry_i^2)}}{n}$$

The formula for COMP is similar to that for estimating variances, which makes sense since both COMP and variance are measures of dispersion.

Referring again to the process of FIG. 1A, the transformation in step 110 helps determine each process element's contribution to the overall dispersion. One possible transformation involves calculating the log of each squared residual value to obtain respective transformed components $Tx_i$ and $Ty_i$ as follows:

$$Tx_i = \log(rx_i^2) \text{ and } Ty_i = \log(ry_i^2)$$

The squaring of the $rx_i$ and $ry_i$ values converts each residual component to an estimate of variance which is the correct quantity for addition of effects in statistics. Then the log of each squared residual component is computed to put the terms into proper form for subsequent analysis.

Proceeding to the analysis step 112 of FIG. 1A, it should be appreciated that different analysis options may exist to effectively determine the dispersion vector effects of each process element on the overall dispersion. Some exemplary forms of the analysis steps are discussed herein, although it should be appreciated that modified or alternative forms of analysis may also be implemented to achieve dispersion optimization in accordance with the presently disclosed technology. In most forms of analysis, a regression-based signature analysis approach is used to fit equations such as set forth below. Each tire result, here the transformed Tx and Ty components, is modeled as a sum of rotated x and y components from each contributing process element. Each process element is defined by a corresponding angular location (e.g., process element A is characterized by angular location $\theta_{A1}$ for tire 1, $\theta_{A2}$ for tire 2, etc.)

tire 1 $Tx = Ax^*\cos(\theta_{A1}) - Ay^*\sin(\theta_{A1}) + Bx^*\cos(\theta_{B1}) - By^*\sin(\theta_{B1}) + Cx^*\cos(\theta_{C1}) - Cy^*\sin(\theta_{C1}) + ROPx^*\cos(\theta_{ROP1}) - ROPy^*\sin(\theta_{ROP1}) + ex_1$ tire 1 $Ty = Ax^*\sin(\theta_{A1}) + Ay^*\cos(\theta_{A1}) + Bx^*\sin(\theta_{B1}) + By^*\cos(\theta_{B1}) + Cx^*\sin(\theta_{C1}) + Cy^*\cos(\theta_{C1}) + ROPx^*\sin(\theta_{ROP1}) + ROPy^*\cos(\theta_{ROP1}) + ey_1$ tire 2 $Tx = Ax^*\cos(\theta_{A2}) - Ay^*\sin(\theta_{A2}) + Bx^*\cos(\theta_{B2}) - By^*\sin(\theta_{B2}) + Cx^*\cos(\theta_{C2}) - Cy^*\sin(\theta_{C2}) + ROPx^*\cos(\theta_{ROP2}) - ROPy^*\sin(\theta_{ROP2}) + ex_2$ tire 2 $Ty = Ax^*\sin(\theta_{A2}) + Ay^*\cos(\theta_{A2}) + Bx^*\sin(\theta_{B2}) + By^*\cos(\theta_{B2}) + Cx^*\sin(\theta_{C2}) + Cy^*\cos(\theta_{C2}) + ROPx^*\sin(\theta_{ROP2}) + ROPy^*\cos(\theta_{ROP2}) + ey_2$ tire 3 $Tx = Ax^*\cos(\theta_{A3}) - Ay^*\sin(\theta_{A3}) + Bx^*\cos(\theta_{B3}) - By^*\sin(\theta_{B3}) + Cx^*\cos(\theta_{C3}) - Cy^*\sin(\theta_{C3}) + ROPx^*\cos(\theta_{ROP3}) - ROPy^*\sin(\theta_{ROP3}) + ex_3$ tire 3 $Ty = Ax^*\sin(\theta_{A3}) + Ay^*\cos(\theta_{A3}) + Bx^*\sin(\theta_{B3}) + By^*\cos(\theta_{B3}) + Cx^*\sin(\theta_{C3}) + Cy^*\cos(\theta_{C3}) + ROPx^*\sin(\theta_{ROP3}) + ROPy^*\cos(\theta_{ROP3}) + ey_3$ tire 4 $Tx = Ax^*\cos(\theta_{A4}) - Ay^*\sin(\theta_{A4}) + Bx^*\cos(\theta_{B4}) - By^*\sin(\theta_{B4}) + Cx^*\cos(\theta_{C4}) - Cy^*\sin(\theta_{C4}) + ROPx^*\cos(\theta_{ROP4}) - ROPy^*\sin(\theta_{ROP4}) + ex_4$ tire 4 $Ty = Ax^*\sin(\theta_{A4}) + Ay^*\cos(\theta_{A4}) + Bx^*\sin(\theta_{B4}) + By^*\cos(\theta_{B4}) + Cx^*\sin(\theta_{C4}) + Cy^*\cos(\theta_{C4}) + ROPx^*\sin(\theta_{ROP4}) + ROPy^*\cos(\theta_{ROP4}) + ey_4$ The above equations can then be solved, for example by using matrix algebra, since the transformed values for each tire Tx and Ty are known, as well as the angular location of each process element in each tire.

In one exemplary embodiment, the analysis implemented in step 112 allows one to determine dispersion contributions of multiple process elements based on any arbitrary combination of angles. Such technique uses a regression analysis approach to determine the contribution, or signature, of each process element's dispersion on the overall dispersion. In this case, each transformed value $Tx_i$ and $Ty_i$ is modeled as a sum of rotated x and y components for each process element. The angles of rotation and the total transformed values are known quantities, and so the contributions of the respective process elements can be determined using known regression techniques.

Referring again to FIG. 1A, step 114 involves a step of optimizing the relative locations for process elements that lead to overall low resultant dispersion. Finally, in step 116, new tires are built with process elements configured in the optimized locations determined in step 114. Again, it should be noted that the location of process elements is determined in part by the nature of the process element(s). So, if process element A is a joint location for the tire carcass, then the location of this joint location can be modified. If process element B is characterized by the angular location in which a green tire is positioned into a curing press, then this relative press location can be modified during the manufacturing process.

Figure 1B:
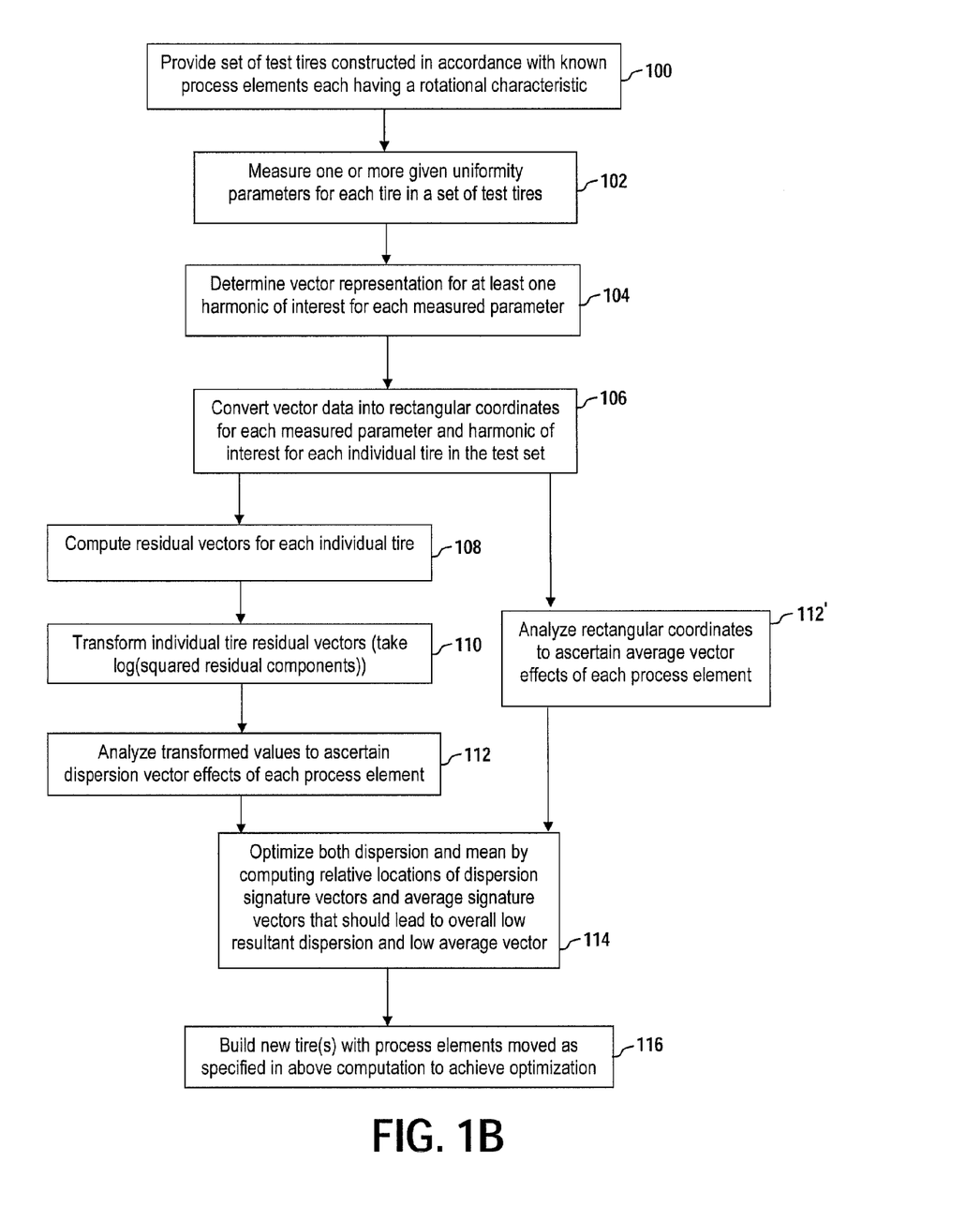
FIG. 1B provides a flow chart of exemplary steps and features in a second method of improving tire uniformity through dispersion optimization.

FIG. 1B displays a second exemplary method of improving tire uniformity in accordance with aspects of the present invention. In the method of FIG. 1B, many steps are the same as in FIG. 1A and so the pertinent discussion above applies. However, a new step 112' involves a separate pass through the above-described regression-based analysis and formula fitting to determine from the raw x and y rectangular coordinates how each process element contributes to the average (or mean) vector. As such, the process of FIG. 1B involves taking the rectangular coordinates from step 106 and computing the analysis of step 112' in parallel with that of steps 108, 110 and 112. By analyzing both the average vector in step 112' and the dispersion vector in step 112, a modified optimization in step 114' provides a method that is often even more robust than the method described in FIG. 1A. Both dispersion and mean are optimized by computing the relative locations of dispersion signature vectors and average signature vectors that should lead to overall low resultant dispersion and low resultant mean.

As will be appreciated from the following numerical example, sometimes the process element locations that optimize for low dispersion or for low dispersion and mean are both different solutions than the optimization when performed for low mean only. Optimization can be implemented to maximize or minimize any number of desired output parameters defining acceptable customer yield or uniformity limits. In some examples, the respective effects of dispersion and mean can be weighted at different levels and then combined in determining the best combination of process element locations to achieve an optimized yield.

EXAMPLE

To better appreciate the processes illustrated in FIGS. 1A and 1B, a numerical example of dispersion analysis is presented. The results below provide simulated data (i.e., test results for hypothetical tires), but exemplify the types of improvements in uniformity achieved from applying the subject analysis to actual manufactured tires. The same type of input data available from the following hypo would be available for actual manufactured tires, and the same regression analysis techniques and equation fitting would be employed. Comparison of resulting output data has constructively verified that similar outputs and corresponding yield values are achieved from analysis of hypothetical and actual tire data. The results below are helpful to explain the disclosed techniques as well as demonstrate improvements in uniformity and corresponding customer yield.

Consider a hypothetical set of tires having non-uniformity contributions from three process elements A, B and C and a variable ROP (Rest of Process), generally representing all other contributing factors. Different sets of test tires with four (4) test tires per set are established for the subject simulation for all possible combinations of the three process elements being rotated at either zero degrees (0°) or one-hundred-eighty degrees) (180°). Since there are $2^3=8$ possible combinations of process element locations, this would result in providing thirty-two hypothetical test tires.

Radial force variation is then measured for each of these test tires in step 102, and the vector representation is determined in step 104 for the first harmonic of the radial force (VRH1). Using basic geometric conversions, the measured vector data is converted in step 106 into rectangular coordinates for each measured VRH1 parameter. Residual vectors for each tire are computed in step 108, and transformed in step 110.

Table 1 below shows simulated radial force variation measurements VRx and VRy as well as corresponding residual vector components rx and ry for each of four test tires having various combinations of angular locations for process elements A, B and C. In addition to the residual vector components, the transformation values Tx and Ty corresponding to the log of each squared residual component is listed for each tire. It should be appreciated that although only two angles (0° and 180°) are used in the exemplary data of Table 1, each source of the dispersion can actually be simulated as a vector that can be rotated to any position from 0 to 360 degrees. In practice, regression analysis techniques allow one to examine any arbitrary combination of angles.

TABLE 1

Dispersion Analysis Example Data

| Tire: | $\theta_A$: | $\theta_B$: | $\theta_C$: | $\theta_{ROP}$: | VRx: | VRy: | Rx: | Ry: | Tx: | Ty: |
|---|---|---|---|---|---|---|---|---|---|---|
| 1 | 0 | 0 | 0 | 0 | 7.7056 | 1.62682 | 2.34274 | 0.66419 | 1.70264 | −0.81838 |
| 2 | 0 | 0 | 0 | 0 | 2.6034 | 4.10559 | 2.75942 | −5.06822 | 2.03004 | 3.24598 |
| 3 | 0 | 0 | 0 | 0 | 8.6716 | 2.00474 | 3.30876 | 1.04211 | 2.39315 | 0.08249 |
| 4 | 0 | 0 | 0 | 0 | 6.376 | 4.37458 | 1.01316 | 3.41195 | 0.02614 | 2.45457 |
| 5 | 0 | 0 | 180 | 0 | 3.2072 | 1.06084 | 0.4119 | −0.73179 | 1.77394 | −0.62453 |
| 6 | 0 | 0 | 180 | 0 | 2.6595 | 2.96774 | 0.95953 | 1.17512 | −0.08262 | 0.32274 |
| 7 | 0 | 0 | 180 | 0 | 2.6739 | 1.92655 | 0.94521 | 0.13393 | −0.1127 | −4.02093 |
| 8 | 0 | 0 | 180 | 0 | 3.4776 | 1.92545 | 0.1415 | 0.13282 | −3.91094 | −4.03746 |
| 9 | 0 | 180 | 0 | 0 | 0.0509 | 3.57421 | 2.21961 | 1.79982 | 1.59466 | 1.17538 |
| 10 | 0 | 180 | 0 | 0 | 1.2443 | 2.25908 | 1.02616 | 0.48469 | 0.05165 | −1.44849 |
| 11 | 0 | 180 | 0 | 0 | 1.1262 | 1.95829 | 1.14431 | 0.18391 | 0.2696 | −3.38665 |
| 12 | 0 | 180 | 0 | 0 | 2.3049 | 1.54286 | 0.03447 | −0.23153 | −6.73537 | −2.9261 |
| 13 | 0 | 180 | 180 | 0 | 1.2646 | 1.66193 | 0.73792 | −0.94245 | −0.60783 | −0.11854 |
| 14 | 0 | 180 | 180 | 0 | 1.3811 | 2.01627 | 0.85437 | −0.5881 | −0.31477 | −1.06171 |
| 15 | 0 | 180 | 180 | 0 | 1.1339 | 1.96565 | 0.60722 | −0.63873 | −0.99774 | −0.89656 |
| 16 | 0 | 180 | 180 | 0 | 1.2357 | 1.77666 | 0.70899 | −0.82772 | −0.68781 | −0.37817 |
| 17 | 180 | 0 | 0 | 0 | 7.2183 | 4.93574 | 1.90301 | 4.33308 | 1.28687 | 2.93256 |
| 18 | 180 | 0 | 0 | 0 | 13.338 | −0.05029 | 8.02306 | −0.65296 | 4.16464 | −0.85249 |
| 19 | 180 | 0 | 0 | 0 | 0.2458 | −1.89664 | −5.06944 | −2.49931 | 3.24646 | 1.83203 |

TABLE 1-continued

Dispersion Analysis Example Data

| Tire: | $\theta_A$: | $\theta_B$: | $\theta_C$: | $\theta_{ROP}$: | VRx: | VRy: | Rx: | Ry: | Tx: | Ty: |
|---|---|---|---|---|---|---|---|---|---|---|
| 20 | 180 | 0 | 0 | 0 | 1.5019 | −5.2175 | −3.81341 | −5.82016 | 2.67705 | 3.52266 |
| 21 | 180 | 0 | 180 | 0 | 3.5164 | 2.41758 | −0.05512 | 0.98492 | −5.79655 | −0.03038 |
| 22 | 180 | 0 | 0 | 0 | 3.2347 | 4.94152 | −0.33678 | 3.50887 | −2.17666 | 2.51059 |
| 23 | 180 | 0 | 0 | 0 | 2.2502 | 0.55534 | −1.32135 | −0.87731 | 0.55731 | −0.26179 |
| 24 | 180 | 0 | 0 | 0 | 2.7944 | 1.69541 | −0.77707 | 0.26276 | −0.50444 | −2.67305 |
| 25 | 180 | 180 | 0 | 0 | 2.4341 | 5.53822 | 0.21114 | 4.12381 | −3.11049 | 2.83355 |
| 26 | 180 | 180 | 0 | 0 | 2.1191 | 1.38291 | −0.10381 | −0.0315 | −4.53033 | −6.91536 |
| 27 | 180 | 180 | 0 | 0 | 1.4844 | 2.01238 | −0.73851 | 0.59797 | −0.60625 | −1.02844 |
| 28 | 180 | 180 | 0 | 0 | 2.2612 | −0.92343 | 0.03833 | −2.33784 | −6.52319 | 1.69846 |
| 29 | 180 | 180 | 180 | 0 | 0.5151 | 1.26604 | 0.03591 | −0.97837 | −6.65371 | −0.04374 |
| 30 | 180 | 180 | 180 | 0 | 1.4307 | 1.90079 | 0.95152 | −0.34361 | −0.09939 | −2.13650 |
| 31 | 180 | 180 | 180 | 0 | 0.8585 | 1.85116 | 0.37938 | −0.39324 | −1.93841 | −1.86665 |
| 32 | 180 | 180 | 180 | 0 | 1.1523 | 2.36730 | 0.67315 | 0.12290 | −0.79159 | −4.19284 |

The analysis described in FIGS. 1A and 1B as step 112 of analyzing the transformed values (Tx and Ty) to ascertain vector effects of each process element can then be conducted to obtain the results shown in Table 2. Such results are obtained by performing dispersion signature analysis which fits the Tx and Ty data of FIG. 1 to equations such as described above using matrix algebra or other mathematical analysis to yield results as follows.

TABLE 2

Regression-Based Analysis of Dispersion

| Source: | DF: | Sum of Squares: | Mean Square: | F Value: | Pr > F: |
|---|---|---|---|---|---|
| Model | 8 | 131.61059 | 16.45132 | 11.16 | <0.0001 |
| Error | 56 | 346.74792 | 6.19193 | | |
| Uncorrected Total | 64 | 478.35851 | | | |

| | | | |
|---|---|---|---|
| Root MSE: | 2.48836 | R-Square: | 0.2751 |
| Dependent Mean: | −0.70410 | Adj R-Sq: | 0.1716 |
| Coeff Var: | −353.41061 | | |

| Variable: | Parameter Estimate: | Standard Error: | t Value: | Pr > |t|: |
|---|---|---|---|---|
| Ax | 0.42634 | 0.43988 | 0.97 | 0.3366 |
| Ay | −0.24265 | 0.43988 | −0.55 | 0.5834 |
| Bx | 1.10648 | 0.43988 | 2.52 | 0.0148 |
| By | 0.75866 | 0.43988 | 1.72 | 0.0901 |
| Cx | 0.74466 | 0.43988 | 1.69 | 0.0960 |
| Cy | 0.68473 | 0.43988 | 1.56 | 0.1252 |
| ROPx | −0.87358 | 0.43988 | −1.99 | 0.0519 |
| ROPy | −0.53462 | 0.43988 | −1.22 | 0.2293 |

Note in Table 2 above that one can examine the R-squared and RMSE values to estimate how much dispersion cannot be attributed to the analyzed factors. Specifically, the R-squared value indicates that these four known components (A, B, C and ROP) explain roughly 27.5% of the dispersion. In understanding this R-squared percentage, it should be appreciated that there are many difference sources of dispersion, many of which are not readily identifiable and some of which are not identifiable as cyclic dispersion effects that are consistently introduced in some periodic fashion within manufactured tires. Because the subject analysis seeks to identify cyclic dispersion effects, this percentage is actually quite significant because it explains that the cyclic dispersion effects contributed by the A, B, C and ROP effects are identifiable and thus can be improved upon in some fashion in accordance with the disclosed techniques.

Once the results in Table 2 are obtained such that the dispersion vector effects from each component (in both x and y coordinates) are determined, such results can be used to make predictions for dispersion when the process elements are set at different angular locations. For example, when all process elements are set at zero degree (0°) rotation angles, one would compute the predicted x and y components (PREDx and PREDy) as follows:

PREDx=0.42634*cos(0)−0.24265*−sin(0)+
1.10648*cos(0)+0.75866*−sin(0)+0.74466*cos
(0)+0.68473*−sin(0)−0.87358*cos(0)−
0.53462*−sin(0)=1.404

PREDy=0.42634*sin(0)−0.24265*cos(0)+
1.10648*sin(0)+0.75866*cos(0)+0.74466*sin
(0)+0.68473*cos(0)−0.87358*sin(0)−
0.53462*cos(0)=0.666

To convert this result to respective standard deviation values (STDx and STDy) and an approximate COMP one would then apply these steps:

1) take the square root of the exponential of each value as follows:

$$STDx = \sqrt{\exp(1.404)} = 2.02 \text{ and } STDy = \sqrt{\exp(0.66)} = 1.40,$$

and 2) compute the approximate COMP value using the same formula:

$$COMP = 1.25 \cdot \sqrt{\frac{(STDx^2 + STDy^2)}{2}} = 1.25 \cdot \sqrt{\frac{((2.02)^2 + (1.40)^2)}{2}} = 2.17.$$

One can apply the same operations to all the combinations in the study or even to unobserved ones and make predictions of the resulting expected COMP values. This approach can be used to seek the best set of angles for lowest possible predicted dispersion and hence be able to optimize for uniformity dispersion. Using the same formulas above, the best condition for location of process elements A, B and C achieved by optimizing dispersion alone can be determined as degree locations A=240°, B=170°, C=160° and ROP=0° yielding PREDx=−3.456 and PREDy=−1.736 which gives STDx=0.178 and STDy=0.420 which ultimately gives COMP=0.403. It should be appreciated in this example that since this COMP calculation is derived from a small study of test tires, it may actually be an underestimate of the COMP that would likely be active in longer-term production and, where possible, this should be included in any yield estimates derived from this study COMP value.

Another example of the subject optimization techniques selects angles that both lower the average vector and reduce dispersion in order to improve overall tire yield. One way to accomplish such an optimization employs a two-step approach in which the average signatures are first identified by passing the raw x and y components through a regression analysis. Then, the dispersion signatures are identified by passing the logged (squared residuals) through the analysis. Then both sets of coefficients can be used in the optimization phase (alone or in various weighted combinations) to identify those combinations of angles that produce the best yield. This approach is generally represented by the flow chart of FIG. 1B.

Table 2 above already shows the regression-based analysis results for dispersion signatures, and Table 3 below shows the regression-based analysis results for average signatures, such as would be obtained in step 112' of FIG. 1B. The same analysis of R-squared and RMSE values as discussed above relative to Table 2 can be applied to Table 3. In particular, the R-squared value indicates that the four known components (A, B, C and ROP) explain roughly 61% of the mean value of the measured radial force, meaning that 61% of the contributing factors to the mean value are explainable. Note that the larger size of the R-squared of 61% for the mean than the 27.5% for the dispersion does not directly indicate the relative importance of the two types in determining uniformity yield. R-squared values measure only the relative size of the known components to the full set of effects and not their absolute impact. For example, R-squared values do not directly indicate the significance of the factors, the suitability of the pattern of the effects, or the relatively higher sensitivity of yield to dispersion than to the mean. As will be shown in Table 4 below, customer yield values are greatly improved when optimization compensates for the effects of dispersion as opposed to compensation for only average values of a measured uniformity parameter.

TABLE 3

Regression-Based Analysis of Mean/Average

| Source: | DF: | Sum of Squares: | Mean Square: | F Value: | Pr > F: |
|---|---|---|---|---|---|
| Model | 8 | 467.97607 | 58.49701 | 11.16 | <0.0001 |
| Error | 56 | 293.53660 | 5.24172 | | |
| Uncorrected Total | 64 | 761.51267 | | | |

| Root MSE: | 2.28948 | R-Square: | 0.6145 |
|---|---|---|---|
| Dependent Mean: | 2.26226 | Adj R-Sq: | 0.5595 |
| Coeff Var: | 101.20350 | | |

| Variable: | Parameter Estimate: | Standard Error: | t Value: | Pr > \|t\|: |
|---|---|---|---|---|
| Ax | 0.02378 | 0.40473 | 0.06 | 0.9534 |
| Ay | 0.17999 | 0.40473 | 0.44 | 0.6582 |
| Bx | 1.54619 | 0.40473 | 3.82 | 0.0003 |
| By | −0.40587 | 0.40473 | −1.00 | 0.3203 |
| Cx | 0.87188 | 0.40473 | 2.15 | 0.0355 |
| Cy | −0.41499 | 0.40473 | −1.03 | 0.3096 |
| ROPx | 2.92099 | 0.40473 | 7.22 | <.0001 |
| ROPy | 1.60352 | 0.40473 | 3.96 | 0.0002 |

Once the process element contributions to both the overall average as well as dispersion have been calculated, it is possible to perform optimization of both by considering some weighted combination of the two parameters. For example, one quantity that is known statistically to estimate yield within a 99% accuracy level for normal distribution involves optimizing the quantity: (mean+3*standard deviation). Using the above formulas for STDx and STDy, this would correspond to optimizing the following quantity:

$$\sqrt{(\bar{x}+3*\mathrm{STD}x)^2+(\bar{y}+3*\mathrm{STD}y)^2}$$

It should be apparent that this quantity considers the contribution of dispersion to overall uniformity as three times more significant than the contribution by mean.

Based on this dual optimization analysis, the best condition for the various process elements is A=240°, B=160°, C=170° and ROP=0°. Note that this is slightly different the embodiment above which optimizes only for dispersion alone. In particular, the angular locations of process elements B and C are shifted from 170 and 160 degrees, respectively, with the dispersion-based approach to 160 and 170 degrees, respectively with the dual dispersion and average optimization approach.

It is significant to realize that the compromise point such as achieved with a dual optimization technique is often not generally equivalent to either the straight mean or the straight dispersion analysis settings. When process locations are optimized based on averages alone (without considering dispersion at all), then the differences can be seen even more clearly. For example, optimized locations for the same process elements when locations are chosen to optimize the average value of a measured parameter are A=120°, B=10°, C=110° and ROP=0°.

For summary, Table 4 shows the three best angular locations for respective process elements A, B, C and ROP when the settings are optimized for dispersion, average, and combined analyses. The respective yields for each of such angular locations are also shown, when analysis is applied to a test set of 1000 tires and an acceptable upper limit for VRH1 magnitude is set at 3.0 kgf. While a yield of only 74% is achieved by optimizing the average values of the measured radial force variation, yields of 92% and 98% are achieved by utilizing the methods shown in FIGS. 1A and 1B, respectively.

TABLE 4

Comparison of the Three Best Angle Combinations

| Analysis Type: | $\theta_A$: | $\theta_B$: | $\theta_C$: | $\theta_{ROP}$: | YIELD: |
|---|---|---|---|---|---|
| Average | 120 | 10 | 110 | 0 | 74% |
| Dispersion | 240 | 170 | 160 | 0 | 92% |
| Both (Disp. & Avg.) | 240 | 160 | 170 | 0 | 97% |

It is clear from the above example that increased customer yield can be achieved in many instances when the analysis includes some form of dispersion optimization. It should be appreciated that when significant dispersion signatures can be identified in a tire manufacturing process, even better yield improvements can be achieved by choosing compensation that optimizes dispersion or both average and dispersion vectors simultaneously.

Figure 9:
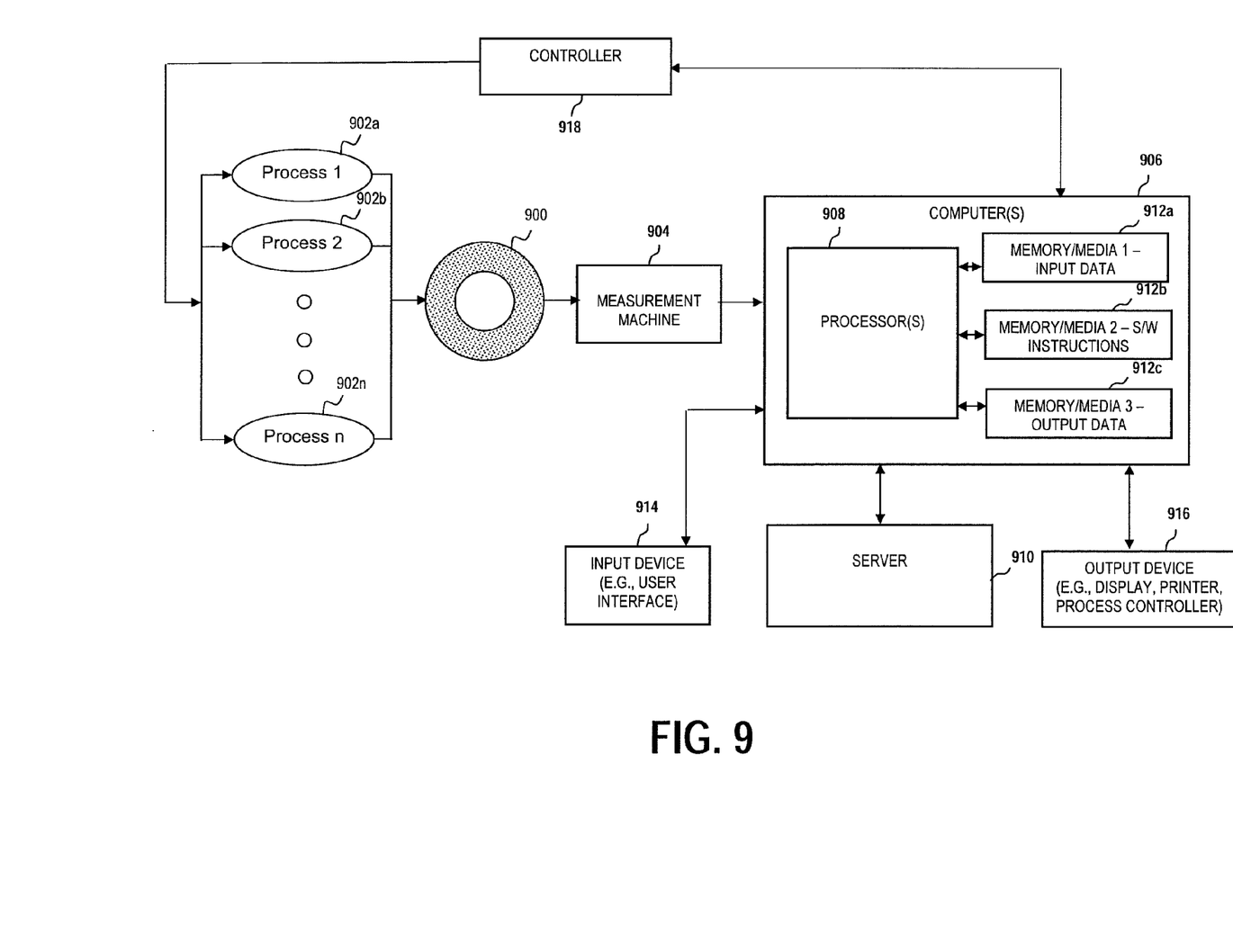
FIG. 9 is a block diagram of exemplary hardware components in a system of the present invention, including various exemplary tire manufacturing, measurement, and post-measurement computer processing components.

Referring now to FIG. 9, a schematic overview of exemplary hardware components for implementing the above-described methodology is illustrated. An exemplary tire 900 is constructed in accordance with a plurality of respective manufacturing processes. Such tire building processes may, for example, include applying various layers of rubber compound and/or other suitable materials to form the tire carcass, providing a tire belt portion and a tread portion to form the tire summit block, positioning a green tire in a curing press, and curing the finished green tire, etc. Such respective process elements are represented as 902a, 902b, . . . , 902n in FIG. 9 and combine to form exemplary tire 900. It should be appreciated that a batch of multiple tires may be constructed from one iteration of the various processes 902a through 902n. Often, it is such a batch of multiple tires that are measured and tested in accordance with the disclosed uniformity improvement techniques. The multiple model tires are then analyzed to improve the tire building process for subsequently manufactured tires.

Referring still to FIG. 9, a measurement machine 904 is provided to obtain the various uniformity measurements obtained in step 102 of FIGS. 1A and 1B. In general, such a measurement machine may include such features as a mounting fixture on which a tire is mounted and rotated centrifugally at one or more predetermined speeds. In one example, laser sensors are employed to operate by contact, non-contact or near contact positioning relative to tire 900 in order to determine the relative position of the tire surface at multiple data points (e.g., 128 points) as it rotates about a center line. It should be appreciated that any suitable measurement machine capable of obtaining uniformity measurements, such as but not limited to RRO, LRO, RFV, TFV, LFV, balance and the like may be utilized.

The measurements obtained by measurement machine 904 may be relayed to one or more computers 906, which may respectively contain one or more processors 908, although only one computer and processor are shown in FIG. 9 for ease and clarity of illustration. Processor(s) 908 may be configured to receive input data including raw measurements of tire parameters, analyze such measurements in accordance with the disclosed uniformity optimization techniques, and provide useable output such as data to a user or signals to a process controller. Uniformity analysis may alternatively be implemented by one or more servers 910 or across multiple computing and processing devices.

Various memory/media elements 912 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 9 shows three separate memory/media elements 912a, 912b and 912c, the content dedicated to such devices may actually be stored in one memory/media element or in multiple elements. Any such possible variations and other variations of data storage will be appreciated by one of ordinary skill in the art.

The computing/processing devices of FIG. 9 may be adapted to function as a special-purpose machine providing desired functionality by accessing software instructions rendered in a computer-readable form stored in one or more of the memory/media elements (e.g., memory/media element 912b). When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

Other memory/media elements (e.g., memory/media elements 912a, 912c) are used to store data which will also be accessible by the processor(s) 908 and which will be acted on per the software instructions stored in memory/media element 912b. For example, memory/media element 912a may include input data corresponding to measured composite waveforms obtained from the measurement machine 904 as well as any predetermined tire parameters, such as but not limited to tire radius, tire width, tire summit mass, tire pressure, tire radial stiffness, tire tangential stiffness, tire bending stiffness, tire extensional stiffness, tread locations, general tire data and the like. Such predetermined parameters may be pre-programmed into memory/media element 912a or provided for storage therein when entered as input data from a user accessing the input device 914.

Input device 914 may correspond to one or more peripheral devices configured to operate as a user interface with computer 906. Exemplary input devices may include but are not limited to a keyboard, touch-screen monitor, microphone, mouse and the like.

Second memory element 912b includes computer-executable software instructions that can be read and executed by processor(s) 908 to act on the input data stored in memory/media element 912a to create new output data (e.g., optimized process element locations in the form of basic numerical values, waveform displays, etc.) for storage in a third memory/media element 912c. Selected portions of the output data may then be provided to one or more peripheral output devices 916.

Output device 916 may correspond to a display such as a monitor, screen, or other visual display, a printer, or the like. Another specific form of output device may correspond to a process controller 918. In one embodiment, controller 918 assists the overall tire manufacturing process by coordinating changes to the process elements 902a, 902b, . . . , 902n that are optimized in accordance with the disclosed processing analysis. For example, uniformity analysis conducted by computer 906 may determine an optimum arrangement for the angular locations of process elements (e.g., product joint locations, curing press position, etc.). These angular locations are provided as output to the controller 918, which is coupled back to the processes 902a, 902b, . . . , 902n in order to implement the determined optimum arrangement of process element angular locations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for improving the uniformity of tires in tire manufacture, comprising the steps of:

providing at least one set of test tires constructed with one or more process elements, each process element being characterized by a known relative angular location;

measuring at least one uniformity parameter for at least one harmonic of interest for each tire in the at least one set of test tires;

determining respective rectangular coordinates for each measured uniformity parameter and harmonic of interest for each tire;

analyzing a form of the determined rectangular coordinates for each tire to identify optimized relative angular locations for each process element that reduce dispersion of the measured uniformity parameter; and building a new tire with the one or more process elements positioned in accordance with the identified optimized relative angular locations.

2. The method of claim 1, wherein said step of analyzing a form of the determined rectangular coordinates comprises:
computing residual vectors for each tire;
transforming the residual vectors by computing the log of the squared value of each residual component; and
determining the contribution of each process element to the transformed residual vectors;
wherein the determined contribution of each process element to the transformed residual vectors is used to identify optimized relative angular locations for each process element that reduce dispersion of the measured uniformity parameter.

3. The method of claim 1, wherein said step of analyzing a form of the determined rectangular coordinates comprises:
computing residual vectors for each tire;
transforming the residual vectors by computing the log of the squared value of each residual component;
determining the contribution of each process element to the transformed residual vectors;
determining the contribution of each process element to the respective rectangular coordinates; and
wherein the determined contribution of each process element to the transformed residual vectors and the determined contribution of each process element to the respective rectangular coordinates are used to identify optimized relative angular locations for each process element that reduce both dispersion and mean of the measured uniformity parameter.

4. The method of claim 3, wherein the optimization of relative angular locations for each process element that reduce both dispersion and mean occurs by weighting the respective effects of dispersion and mean at different levels, and then combining the weighted effects to determine the best combination of process element locations to achieve an optimized yield.

5. The method of claim 3, wherein the optimization of relative angular locations for each process element that reduce both dispersion and mean occurs by maximizing the sum of the mean value and three times the standard deviation.

6. The method of claim 1, wherein the one or more process elements established in said step of providing at least one set of test tires comprise one or more of a material component, a manufacturing technique and a controllable condition used in construction of a tire.

7. The method of claim 1, wherein the at least one uniformity parameter measured in said step of measuring at least one uniformity parameter comprises one or more of radial run out (RRO), lateral run out (LRO), mass variance, balance, radial force variation (RFV), lateral force variation (LFV) and tangential force variation (TFV).

8. The method of claim 1, wherein the one or more process elements established in said step of providing at least one set of test tires corresponds to a start point or joint overlap location for one or more of casing textile plies, belt plies, bead rings, inner liner, tread and other rubber layers of the tires.

9. The method of claim 1, wherein the one or more process elements established in said step of providing at least one set of test tires corresponds to one or more of the introduction of a green tire onto a building drum, placing a green tire into a mold or press and subjecting the green tire to heat and pressure.

10. The method of claim 1, wherein said step of determining respective rectangular coordinates for each measured uniformity parameter and harmonic of interest for each tire more particularly comprises: determining a vector representation for at least one harmonic of interest for each measured uniformity parameter; and converting the vector data into rectangular coordinates.

11. A system for improving the uniformity of tires in tire manufacture, comprising:
a first memory adapted for storing one or more measured uniformity parameters for a plurality of test tires and rotational characteristics for one or more process elements used in constructing the plurality of test tires;
a second memory adapted for storing software in the form of computer-executable instructions; and
at least one processor coupled to said first and second memories and configured to selectively implement the computer-executable instructions stored in the second memory to analyze the measured parameters and rotational characteristics stored in the first memory;
wherein said at least one processor is configured to implement the computer-executable instructions stored in said second memory in order to implement the functions of: determining respective rectangular coordinates for each measured uniformity parameter and harmonic of interest for each tire; and analyzing a form of the determined rectangular coordinates for each tire to identify optimized relative angular locations for each process element that reduce dispersion of the measured uniformity parameter.

12. The system of claim 11, wherein said at least one processor is more particularly configured to analyze a form of the determined rectangular coordinates by: computing residual vectors for each tire; transforming the residual vectors by computing the log of the squared value of each residual component; and determining the contribution of each process element to the transformed residual vectors.

13. The system of claim 11, wherein said at least one processor is more particularly configured to analyze a form of the determined rectangular coordinates by: computing residual vectors for each tire; transforming the residual vectors by computing the log of the squared value of each residual component; determining the contribution of each process element to the transformed residual vectors; determining the contribution of each process element to the respective rectangular coordinates; and identifying optimized relative angular locations for each process element that reduce both dispersion and mean of the measured uniformity parameter.

14. The system of claim 11, further comprising an output device for displaying the optimized relative angular locations for each process element.

15. The system of claim 11, further comprising a measurement machine onto which a plurality of test tires are mounted and rotated to obtain the one or more measured uniformity parameters.

16. The system of claim 11, further comprising a controller communicatively coupled to said processor for receiving output data representative of the optimized relative angular locations for each process element.

17. The system of claim 16, wherein said controller is coupled to a tire construction system to build a new tire with the one or more process elements positioned in accordance with the identified optimized relative angular locations.

* * * * *